United States Patent [19]

Broussard et al.

[11] 4,252,465
[45] Feb. 24, 1981

[54] PIPELINE GEL PLUG

[75] Inventors: Douglas E. Broussard, London, England; Vitold R. Kruka; Paul R. Scott, both of Houston, Tex.

[73] Assignee: Shell Oil Company, Houston, Tex.

[21] Appl. No.: 11,823

[22] Filed: Feb. 13, 1979

Related U.S. Application Data

[63] Continuation of Ser. No. 823,810, Aug. 11, 1977.

[51] Int. Cl.³ .............................................. F16L 1/00
[52] U.S. Cl. .................................... 405/158; 405/170
[58] Field of Search ............. 405/157, 158, 161, 166, 405/167, 168, 169, 170, 171; 252/28, 8.55 R, 316; 166/294

[56] References Cited

U.S. PATENT DOCUMENTS

| 2,531,440 | 11/1950 | Jordan | 252/28 |
| 3,739,591 | 6/1973 | Jones | 405/166 |
| 3,890,693 | 6/1975 | Eagleton et al. | 405/158 X |
| 3,961,493 | 6/1976 | Nolan et al. | 405/158 |
| 3,977,201 | 8/1976 | Bittner | 405/170 |
| 3,978,678 | 9/1976 | Duncan et al. | 405/171 |
| 4,040,974 | 8/1977 | Wright et al. | 252/28 X |

Primary Examiner—Dennis L. Taylor

[57] ABSTRACT

A gel plug is employed during construction of an offshore pipeline to separate a gas-filled portion of the pipeline from a water-flooded portion, and to facilitate control and movement of the gas/gel plug/water interface as desired to assist in construction operations.

20 Claims, 1 Drawing Figure

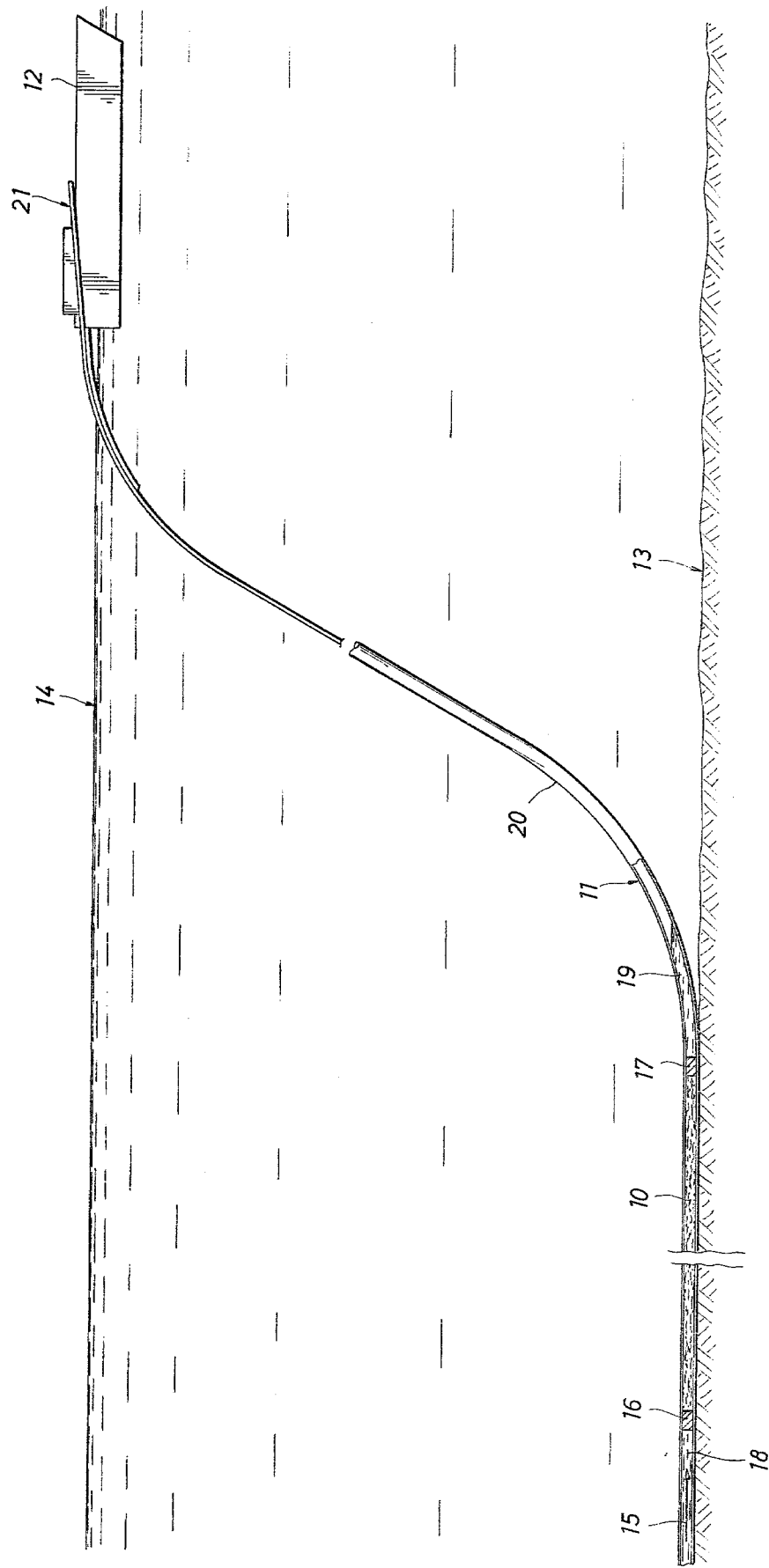

PIPELINE GEL PLUG

This is a continuation of application Ser. No. 823,810, filed Aug. 11, 1977.

BACKGROUND OF THE INVENTION

Pipelines are long, hollow, flexible tubes of metal. When one end of a long pipeline lying horizontally on a flat surface is raised vertically, the pipe bends due to the weight of the unsupported segment. The maximum bending stress occurs in the bend near or at the horizontal surface. This bend is commonly referred to as the sagbend. As the end of the pipe is raised higher, the bending stress increases in the sagbend. Depending partially upon the pipe diameter, the wall thickness and the tensile strength of the metal, the pipe will collapse when the compressive and tensile forces developed along the bend exceed the physical strength of the metal walls. The collapse may result in tearing and otherwise rupturing the pipe wall. When this occurs under water, as in a submarine pipe laying operation, it is known as a wet buckle. The free end of an anchored horizontal pipe can be raised higher before collapse occurs, if the pipe is stretched; e.g. kept under tension. Loss of the ability of keep the pipe under tension, due possibly to the failure of a barge anchor to hold, may result in a wet buckle of the pipe. The high velocity (up to 100 fps) water which enters through the rupture may fill a significant portion of the pipe before corrective action can be taken. Further, the water introduces undesirable and difficult to remove silt, sand and stones into the line. Before laying can be resumed, the pipe is commonly blown clear of water so that the ruptured end can be picked up. Wet buckles thus can result in substantial delays.

Lines can also be ruptured or punctured by foreign objects away from the sagbend. Anchors of ships are an example of such foreign objects. Water rushing in through the puncture will reach the sagbend and begin to fill the vertical portion of the pipe. The additional unsupported weight will in turn lead to a wet buckle at the sagbend.

One method of burying pipe lying at the bottom of water is to remove the soil beneath the pipe with high-velocity water jets which suspend the soil particles in a water-soil slurry so that the pipe sinks into the suspended soil. An air-filled pipe, because of its light weight under water, will not readily sink into the suspension. While water filling the pipe prior to trenching can reduce the time, effort, and expense of burying the pipe, the water may also lead to wet buckles as above noted.

A weight coating such as concrete may be applied to large-diameter pipe to cause it to sink in water. The weight handling ability of the pipe laying equipment and economic reasons normally limit the quantity of coating close to the minimum necessary to cause the pipe to sink. The air-filled pipe lying on the bottom of the water body then is near the density of the water and thus easily moved about by flow currents which can shed vorticies behind the pipe. These vorticies, if at one of the natural frequencies of the pipe, may induce vibratory motion in the pipe with resulting stresses spalling the concrete off the pipe, creating a buoyant pipe. Thus, it is desirable to water-fill such pipe, yet somehow avoid the above-noted problems with wet buckles.

Of pertinance to the present invention are U.S. Pat. Nos. 3,425,453; 3,842,612; 3,788,084; 3,472,035; 3,656,310; 3,777,499; 3,525,266; 3,751,932, 3,890,693.

The present invention not only provides a solution to the above problems, but also includes other improvements as more particularly described hereinafter.

SUMMARY OF THE INVENTION

A primary purpose of the present invention is to provide a movable gel plug which will separate a water-filled segment of an off-shore pipeline from an ambient air-filled segment, and thus allow waterfill weighting of a completed segment to within a predetermined distance from the operating vessel. Specifically, the movable gel plug is designed so that: (1) it can be pumped at low velocities in a largediameter pipe at a predetermined pressure, and upon cessation of pumping stops to withstand the hydrostatic force exerted by a relatively high column of water; (2) it can be pumped for many miles without losing this ability; (3) it is not contaminated by existing coatings on the pipe wall or by sea water and debris which may enter the pipe during construction; and (4) after stagnation time of up to one year or longer, it is movable by the previously predetermined pressure.

Such a movable gel plug, as above described, may be inserted into a pipeline at the shore end and followed by pressurized water which pushes the plug into the desired position, or inserted from the vessel end and pushed into the desired position by gas (e.g. air) pressure. This part of the pipeline then sinks due to increased weight. When the unfinished end of the pipeline is temporarily abandoned (due to weather conditions, et cetera), air is sealed into the unfinished but capped end. The shore end is further pressurized to reduce the volume of air, causing the pipeline to sink. To retrieve the unfinished end, the pressure is merely reduced.

The gel plug may also be used in a segment of pipe to temporarily prevent sea water from flooding the pipe when it is towed empty to the job site. Pipelines are sometimes constructed by joining long segments of pipe, made up on land, and then towed or dragged to the installation points for joining into the pipeline. In these operations, it is desirable to reduce the weight of the segments by the buoyancy of the air-filled pipe. Gel plugs are placed at each end of such segments to prevent water filling during pipe tow.

The present invention encompasses construction of pipelines in any body of water (whether ocean, lake, river, et cetera) by either a pull technique where the pipeline is assembled onshore and pulled offshore by a vessel (tug, et cetera), or by offshore assembly where the pipeline is constructed piece-by-piece from a vessel (e.g. lay barge).

DESCRIPTION OF DRAWINGS

The drawings show a schematic view of the present invention.

DESCRIPTION OF PREFERRED EMBODIMENT

As shown in the drawings, a gel plug 10, which may be several miles in length, is situated inside pipeline 11 in the part of the line just behind pipe-lay barge 12 which rests on the ocean floor. From the top of the ocean 14 to the bottom 13 may be on the order of several hundred feet. Water injected from the shore (not shown) in the direction of arrow 15 moves a gel plug to a selected distance behind barge 12. The plug 10 is preceded and followed by markers 16 and 17 which locate the front and rear of the gel plug with respect to the pipeline so that the proper location and integrity of the plug may be maintained. The markers, which may consist of transponders or radioactive isotopes, may be inside or adjacent one or more pigs which separate the gel plug from liquid 18 and liquid 19 (if present) and ambient air 20, and maintain the quality and length of the plug. When the unfinished end 21 of the pipeline is capped and abandoned and barge 12 is removed (due to weather conditions, et cetera), air is sealed (seal means not shown) into the unfinished end. The shore end (not shown) is further pressured (arrow 15) to reduce the volume of air 20, causing the unfinished end 21 to sink to bottom 13. To retrieve unfinished end 21 (e.g. when the weather improves), the pressure is merely reduced (opposite arrow 15) in the pipeline.

The movable gel plug of the present invention may be formulated, for example, from hydrocarbon liquids, fatty acids, bases and fillers. Gel plug properties may be adjusted, within limits, by the appropriate concentration and type of these constituents. The requirements of a movable gel plug for a submarine pipeline are unique and differ from requirements for such things as drilling fluids, mudpacks, product separators, and line scrappers which, in fact, are not comparable to the present invention. The movable gel plug is a plastic fluid having a high yield strength, high viscosity, and low gel strength. The yield strength is independent of shear stress, shear rate, total work input, and time. Plastic fluids were defined by Bingham as fluids having a yield strength that must be exceeded in order to initiate flow. More importantly for the movable gel plug, the flow stops when the force applied is less than the force required to overcome the yield strength. Plastics exhibiting thixotropic properties (e.g. their flow properties may be time-dependent) are undesirable for use with the present invention. When a thixotropic fluid is allowed to stand quiescent, a gel structure is built up. When stress is applied, the gel structure breaks when the gel strength is exceeded. Movement further reduces the gel structure and decreases the flow resistance.

A thixotropic plastic, at low pressures, usually flows as a plug lubricated by a thin film of highly sheared liquid at the pipe wall when the applied force is greater than the resistance force due to the yield strength. Accordingly, non-thixotropic Bingham plastic is the best type of fluid for the movable gel plug. Inasmuch as the yield value of a plastic fluid can depend on friction between particles, specific surfaces area, and interparticle attractive forces, the gel plug of the present invention also contains a high concentration of small, solid particles.

The adhesive bond between the gel plug and pipewall must require more force to break than the force required to overcome the yield strength. Otherwise, the force required to move the plug would be equal to the force required to overcome the adhesive bond and not the yield strength. Also, the gel plug of this invention has the ability to adhere to the pipe wall if it is oil wet, water wet, or coated with paints or dirt. Because of this requirement, the gel plug employs polar, aromatic, acidic, unsaturated, and adhesive polymer materials.

If, for example, the maximum pipeline depth below mean sea level is 530 feet, and the height of an on-shore water injection pump is 50 feet above mean sea level, then the maximum hydrostatic head to which a gel plug therein, followed by water, can be exposed is 580 feet. Conservatively assuming that the line is filled with treated 3.5% saline sea water at 4° C., then the 580 feet head corresponds to a hydrostatic pressure of 259 psi. Such a plug must, at a minimum, be able to withstand this pressure without movement. Higher yield pressures (initiation of motion), however, are desirable in view of incursion of foreign water into the gel plug leading to decreased plug yield strength. For water-immiscible hydrocarbon-base plugs, the foreign water is transported through the center of the plug and deposited at the front end. Continued plug movement pushes the water ahead without intermingling of the two phases. During the time that water is within the gel plug, the plug as a whole exhibits lower yield strength and viscosity. Sources for the incursion consist of water slippage past water/gel plug separators and line breaks in the leading part of the plug. The separators of the present invention do not pass water during normal operations but may do so when moving over obstacles left within the pipe. Accidental line breaks in the leading part of the plug, where internal pressure is less than local sea hydrostatic pressure, similarly allow water incursion. Line breaks at the trailing part of the plug will lead to gel discharge into the sea. In addition to the above accidental gel loss, there is some continuous loss past the separators as the plug moves down the line.

Considering the above parameters, if is preferred, as mentioned, that the gel materials behave as Bingham plastics or shear thinning Bingham plastics, and that the gel plug yield strength be over designed by in some cases a factor of about two. The yield pressure may then be twice the maximum hydrostatic pressure. Another requirement for the plug is that it be able, at a minimum, to move at the maximum pipelaying rate, and to do so at acceptable pressures. For example, if the maximum design velocity is 0.2 fps or 3.27 miles per day, and the pressure limit is approximately 2200 psi, and design line discharge pressures range from 1100 to 1400 psi, then it is desirable that the plug move at 0.2 fps when subjected to about 1000 psi. Short plugs are undesirable because: (1) the consequent high yield gel is difficult to prepare and handle; (2) more rapid depletion of short plugs assuming quantity of gel material left behind by water/gel separators is independent of yield strength; and (3) reduction in yield and viscosity is more severe in short plugs for a fixed quantity of water incursion. Long plugs, on the other hand, also have drawbacks; for example: (1) the attendant low yield strength is more likely to allow water seepage past water/gel separators; (2) cost is approximately proportional to length; and (3) gel plug disposal problems are proportional to length. The present invention strikes a compromise between the above-listed criteria for determining length.

Velocity is approximately proportional to pressure drop and inversely proportional to plastic viscosity. The pressure drop to sustain a given velocity is controlled by the choice of viscosity. A high viscosity, resulting in a high pressure drop, yields a thick boundary layer along the pipe wall. The gel material beyond the boundary layer moves as a solid core. A thick secondary layer provides good mixing and renewal of the gel layer immediately adjacent to the wall, faster than is the case with a thin boundary layer. Contamination of the wall layer by foreign substances (rust, debris, oil, water) and reduction in its effectiveness are also less severe with thick boundary layers. Water fingers along the plug and pipewall result in a thin annulus in the case of high yield but low viscosity materials for high viscosity materials, the water is transported along the solid core resulting in a lower reduction in plug effectiveness. Further, high viscosity plugs require very high pressures for rapid motion and such pressures may not be available. Also, high viscosity plugs have an inherent safety factor against equipment failure or unforeseen gel failure as they provide a longer reaction time for correction. In summary, high viscosity gel materials are desirable in the present invention because of: (1) more rapid renewal of contaminated wall layers; (2) reduced likelihood of water fingering along the pipewall, resulting in total or partial plug failure; and (3) increased reaction time for correcting system failures or malfunctions.

The gel plug is pushed along the line by water, either treated sea water or fresh water. To facilitate tracking and/or provide a backup means for tracking, a positive displacement pump capable of handling water is employed. To limit contamination of the water by lubricating oils, the pump is a plunger type. Within these parameters, any common pump equipped with appropriate surge dampeners is acceptable. A preferred nominal working pressure is about 1000 psi (less hydrostatic head); however, the pump is able to develop pressures up to the line pressure limit in order to overcome high pressures developed when the plug passes major obstructions in the line. Such obstructions may be introduced into the line during wet buckles. Pump speed may be changed, preferably by a gear box through gear change-out, or multiple pumps may be employed for the same purpose. Stepwise variation in pumping rate serves several useful purposes, including: (1) variable pumping rates allow tracking of gel plug yield strength and viscosity (a minimum of two speeds, preferably three speeds, is required for this purpose); (2) variable rates allow easier and better coordination between pipe laying and plug advance rates; and (3) high pumping rates are advantageous during emergencies.

Due to measurement errors and the need for precise plug location, several means of tracking the plug are employed. Precise plug location is essential for maintaining the plug close to the pipeline sagbend. A short distance between the sag bend and location of the line break is desirable because it: (1) limits the influx of difficult-to-remove debris; (2) shortens the time required for emptying, cleaning and picking up of the broken line; and (3) stabilizes the line segment immediately after the sag bend. Readily available means of tracking the plug include: (1) a material balance together with thermal coefficients of expansion and temperature profile along the line; (2) a marker at the water/plug interface; and (3) a marker at the plug/air interface and/or sensor of the plug/air interface without marker.

Plug location by material balance is based on volumetric measurements of both gel material and water. The quantity of gel plug introduced into the line is back checked by a mass balance of material mixed. The measured volumetric input is adjusted for thermal expansion, compression, and expansion of the pipeline due to pressure and temperature in order to arrive at linear plug displacements.

Adjustments are made over the pipeline length to account for temperature and hydrostatic pressure variations as well as diameter variations. The result would be more accurate if the initial pipe diameter were known precisely. Accurate measurement of the internal line diameter is difficult in the slightly out-of-round pipe with a weld seam, and will vary from pipe joint to pipe joint. Thus, due to practical limitations, tracking of plugs in long-distance pipelines is not very accurate. However, differential tracking from one known location to a predetermined other location separated by a distance of a few miles, is with proper corrections, accurate. Due to the relative ease of measurement, material balance tracking is employed for relatively rough indication of absolute plug location, and more importantly, for daily or weekly plug advance determinations.

The liquid input to the pipeline is measured by accurate, totalizing positive displacement meters suitable for water service. Ideally, the meters are located downstream of the injection pump so as to discount any pump leakage. High pressure water service pumps usually develop significant leakage with use even when the suction is carefully filtered for solids. Where high pressures preclude the use of downstream meters, leakage is collected by a measurable means such as a calibrated tank, et cetera. A pump revolution counter or totalizer serves as a back-up flow indicator. Differences in flow rate indicated by pump and meter also serve as a measure of pump seal conditions.

Due to uncertainties in locating the plug by the material balance method, other means are employed as well. As the water and gel plug are segregated by a separator, the separators are loaded by markers, detectible from the outside of the line. Conventional battery-operated pingers require unconventional battery sources or multiple, timed batteries to meet long life requirements. A relatively long half-life radioactive source, capable of penetrating steel and concrete, and something in the order of 100-feet of water, is a preferred alternative. Such a source is detected by an instrumented mini-submarine. If conventional navigation on the submarine is not precise enough to pinpoint its location after it has detected the marker, then easily-detectable, visual markers are placed at predetermined intervals, external to the pipe, to aid the submarine.

The leading front of the plug, the one near the lay barge, is similarly tracked in order to measure plug depletion and to provide yet another back-up means of locating the exact position of the plug. Differences in location between the trailing marker and the front end give a measure of quantity of gel material left behind the water/gel separator and/or the intrusion of water into the plug. Water which enters the plug will eventually be transported to the front of the plug and will not, subsequently, be re-entrained into the plug. To this water is added water condensing from the warm air in the pipe as it cools upon descent to the ocean floor.

Other means of locating the front of the plug are by completely external methods. For example, the response time for reflection of accoustic or stronger signals generated at the lay barge may be measured. Such signals respond to a water front as well as a gel material front. If trailing marker measurements and plug front measurements show excessive plug lengths, then these are most likely due to water intrusion and this water will eventually end up at the front of the plug. As water does not possess any yield, it moves to the lowest part of the line. In down-grade portions of the ocean floor, this water collects at the sag bend of the line and is removed by a submersible pump lowered from the lay barge. The submersible pump is lowered while connected to the barge for power and water discharge. Gel plug properties are tracked by intermittant measurement of the plug yield and viscosity by: (1) observing on-shore pressure when the plug ceases movement; (2) measurement of water pump discharge pressure of at least two, preferably three, pumping rates; and (3) measurement of plug length between the trailing marker and the leading front.

Applicable mixers for forming the gel plug are similar to those found in the caulk industry, bakeries, heavy chemicals and cosmetic industries and do not require extensive description herein. These mixers usually have high torque, low PPM, counter-rotating paddles or kneaders, and are jacketed for temperature control. Elevated temperatures are desirable to reduce the gel consistency and to also increase the rate of dispersion and reaction of some of the essential surface-active chemicals.

As the gel plug moves as a solid core in the center of the pipe with a boundary layer between the core and pipe wall, then water injected behind the plug will move with the solid core, leaving the boundary layer material undisturbed at the pipe wall. Such a plug will rapidly be consumed, leaving only a useless annulus in the pipe. To avoid this, the water is segregated from the gel material by a separator. Further, the separator scrapes up the boundary layer material left behind and moves it into the core region, thus continuously renewing the faster-moving core. Fractical consideration also place other requirements on the separators. For example, (1) water must not leak past the separator; (2) gel plug material must not be left behind the separator; (3) the separator must tolerate out-of-round pipe and other diameter changes; (4) the separator must be able to pass obstacles (welding icicles, tools, debris introduced into the pipe during wet buckles); and (5) the separator must be capable of traveling many miles without effective water or other deterioration. A hollow, overinflated sphere satisfies these requirements best. It does not provide a perfect seal but passes over obstacles by rolling and yielding in shape. Alternatively, a series of spheres may be used. The sphere material has relatively high flexibility (low hardness durometer), high tear resistance, high abrasion resistance, low compression set, high solvent resistance, and low water absorption. The most suitable material is a low-durometer hardness urethane rubber.

Leakage past the sphere can occur under both static and dynamic conditions. In the static case, a gap must be present between the pipe and sphere. Such gaps can be due to sphere wear or due to an obstruction which separates the sphere from the pipe. A zero-leak condition in the presence of a gap relies on the yield strength of the material in the gap. Thus, even a small amount of water, immediately in front of the sphere, and a negative pressure gradient will result in loss of yield strength and in leakage which can transfer a significant amount of water with time to the plug side of the sphere. In addition, every effort is made to avoid the introduction of water in front of the sphere during sphere launching.

Some small quantity of water-insoluble gel material is left on the pipe wall after passage of the plug. This material is removed by use of brushes and hydrocarbon solvent acting as a diluent. This wash cycle is included as a sphere-separated batch in the water pushing the plug, or added as a separate phase at project completion but prior to line emptying. The latter is preferred because: (1) the hydrocarbon is not present in the line during the multi-year project life and is not subject to discharge into the ocean in case of line breaks; (2) the hydrocarbon, unlike water, permanently decreases plug yield and viscosity, thus requiring very secure separation means when both are present in the line at the same time; and (3) the high velocities during line dewatering keep the solid filler of the gel suspended in the solvent and allow its removal.

Gel plug disposal methods depend on the plug constituents and environmental requirements. It is highly likely that plugs of low toxicity can be discharged into the sea. If the solid filler is calcium carbonate, resulting in a plug specific gravity of approximately 2.0, the plug will remain stable on the sea floor for eventual biological degradation. If disposal at sea is deemed unacceptable for any reason, then the plug material can either be barged to shore for eventual disposal or can possibly be cleaned and disposed as oil-base drilling muds are.

With a plug system, a line break or rupture between shore and plug is detected by monitoring water input and plug advance. Most important, such a break will not lead to a wet buckle as the plug will preclude water movement beyond it and up beyond the sag bend. To assist in locating the break, the pipeline water may contain a dye, such as sodium fluorescine, which is detectable at parts-per-million levels.

Line breaks occuring in the trailing part of the plug (exact length depends on line depth and applied pressure) and detected again by monitoring water input and plug front advance. Again, a wet buckle is prevented as water will not enter the line but rather, plug material will be discharged into the sea. The discharged material also serves as a marker in locating the break.

Line breaks in the leading part of the plug will allow influx of water. Such influx is slowed by the plug and is detected by monitoring the location of the trailing marker and the plug front. Depending on the location of the break (assumed to be due to anchor damage and not a complete pipe scission), the water influx may be sufficiently slowed to allow capping of line and lowering to the bottom before a wet buckle can occur.

The plug cannot, of course, preclude wet buckles due to improper lay barge movement, improper pipe tension, or any line leaks between the plug and ocean-free surface. All of the above will result in a wet buckle. But the plug does reduce the amount of difficult-to-remove debris entering the line and does reduce the time for repair and subsequent line pick-up for continued pipe laying. The total quantity of debris drawn into the line depends on water velocity, length of time over which such velocity is maintained, and quantity and type of material available at the break. A plug in the line does not affect availability of debris but does limit the time over which high velocities exist and certainly limits the length of line over which it travels. The plug thus reduces total amount of debris entering the line by an undetermined amount and limits intrusion length to less than the distance between break and plug. Both from a velocity-time point of view and intrusion-length considerations, it is desirable to have the front of the plug as close to the sag bend as is practical.

Recovery after a wet buckle depends on length of undamaged line ahead of the plug and need for maintaining a clean line. In case of a short length and desire for a clean line, the line is cut at the gel plug, capped, and the gel plug blown back with a gas (air for low-volatility oil base gels or inert gas for high-volatility oil base gels) for a distance equal to the freely-suspended pipe span from the barge. During this time, the onshore end of the pipeline is opened to the atmosphere.

If economic considerations preclude abandonment of the length of line between the break and the front of the gel plug, then the line is cut at a point of zero damage, capped, and pushed back with gas, as before, for the minimum-required length. On subsequent line lifting and plug advance, the water is pumped out by the submersible pump mentioned previously for normal water evacuation. Debris which has entered the line remains in place with the exception of sand, some of which will continue to move ahead of the plug for the remaining pipeline distance.

The gel plug may be depleted due to excessive leakage past the water/gel separator or lose some effectiveness due to ageing or mixing with contaminants in the pipe. During the laying season, such depletion becomes obvious from gel plug tracking data. If such depletion is observed, the plux is replenished from the lay barge. If the failure occurs during the off-season while the plug and line are on the sea floor, then such may be observed by reduced onshore pressure. The plug will again have to be replenished.

If the plug exhibits increased yield and viscosity with time, such will again become apparent from the gel plug tracking data. The plug will have to be diluted with additional hydrocarbon solvent. Such solvent also can be introduced into the plug through tape and high pressure hoses added to the line as it is being laid. The solvent can be pumped into the plug as it crosses the pre-installed tap. Gel is similarly added to the plug.

EXAMPLE:

A 36-inch, 280-mile long pipeline is to be laid from a shore 50-feet above mean sea level. Maximum water depth to be encountered is 530-feet. Minimum sea bottom temperature is 39° F. Pipe wall thickness is 0.866-inches. The pipe is coated with cement to provide a nominal submerged, empty pipe weight (negative buoyancy) of 80-pounds per foot. The gel plug is to be pushed by treated sea water.

Gel plug design criteria are as follows:
1. The gel plug must withstand the maximum hydrostatic load of 259 psi without yielding or moving.
2. The gel plug must move at a rate of 0.2 fps when subjected to a pressure of 1000 psi.
3. The gel plug is to be a Bingham plastic.
4. The gel plug is to be able to sustain a depletion past the separator corresponding to a wall layer thickness of up to 30 mils.
5. A gel which mixes wall-contaminated layers (rust, oil, et cetera) rapidly under normal operating conditions.

A gel plug meeting the above criteria is represented by:
Yield Stress: 2,415 degrees/ct$^2$
Plastic Viscosity: 2,773 poise
Plug Length: 2 miles
Plug Volume: 12,046 bbls.
Wall Mixing Layer Thickness: 8.24-inches The treated sea water and gel plug are separated by at least one, preferably more, rubber spheres. The sphere is hollow with at least a 4-inch thick wall and is inflated by a 50/50 mixture of glycol and water to a 35.639-inch OD. Such a sphere will leave less than 1 mil of the gel material along smooth walls. It also will preclude leakage past the sphere when gaps between the sphere and pipe wall are less than 0.008-inches. The sphere is made of low-durometer polyurethane to limit wear.

We claim as our invention:

1. A method for liquid-fill weighting an offshore pipeline to within a predetermined distance from a vessel which is deploying the pipeline, comprising preparing a Bingham plastic gel plug, inserting the gel plug into the pipeline to separate a gas-filled segment of the pipeline adjacent to the vessel from a liquid-filled segment of the pipeline, and maintaining the predetermined distance of the plug from the vessel as the pipeline is deployed.

2. The method of claim 1 including adding pipe segments to the pipeline from the vessel and moving the gel plug as the pipe segments are added in order to maintain the pre-determined distance of the gel plug from the vessel.

3. The method of claim 1 including adding pipe segments to the pipeline at an onshore location, pulling the pipeline offshore by the vessel, and retaining the gel plug essentially stationary within the pipeline as the pipe segments are added in order to maintain the predetermined distance of the gel plug from the vessel.

4. The method of claim 1 including adjusting the position of the gel plug by applying gas pressure from the vessel end of the pipeline.

5. The method of claim 1 including continuously positioning the front of the gel plug at approximately the vicinity of where the pipeline first touches bottom.

6. A method for liquid-fill weighting an offshore pipeline to within a predetermined distance from a vessel which is deploying the pipeline, wherein the pipeline extends from onshore to the vessel, comprising inserting a gel plug into the pipeline to separate a gas-filled segment of the pipeline adjacent to the vessel from a liquid-filled segment of the pipeline, and pressuring the gel plug by fluid from the shore end of the pipeline to a position in the pipeline just behind the vessel and maintaining the gel plug by fluid pressure at the predetermined distance from the vessel as additional pipeline is laid from the vessel.

7. A method for liquid-fill weighting an offshore pipeline to within a predetermined distance from a vessel which is deploying the pipeline and for temporarily sealing and sinking one end of the pipeline, comprising inserting a gel plug into the pipeline to separate a gas-filled segment of the pipeline adjacent to the vessel from a liquid-filled segment of the pipeline, maintaining the predetermined distance of the plug from the vessel as the pipeline is deployed, sealing the end of the pipeline adjacent the vessel, and pressuring the liquid-filled segment of the pipeline to reduce the volume of the gas-filled segment in the pipeline adjacent the sealed end, whereby the sealed end sinks.

8. The method of claim 7 including retrieving the sealed end of the pipeline by reducing pressure on the liquid-filled segment, whereby the gas-filled volume expands and the sealed end floats or is sufficiently light for pick-up.

9. The method of claim 1, wherein the gel plug is a nonthixotropic Bingham plastic.

10. The method of claim 3 including determining the location of the gel plug by measuring the amount of fluid added to the pipeline to move the gel plug.

11. The method of claim 3 including preceding and following the gel plug with transponders or markers locating the front and rear of the gel plug with respect to the pipeline.

12. The method of claim 3 including preceding and following the gel plug by pigs separating the gel plug from fluids or gasses present in the pipeline.

13. The method of claim 12 including locating transponders or markers inside the pigs.

14. The method of claim 1 including inserting a pump into the pipeline between the gel plug and vessel and removing fluid which accumulates therein.

15. The method of claim 6 including measuring gel plug yield, at least intermittently, by observing onshore pressure when plug movement ceases.

16. The method of claim 6 including measuring gel plug yield and viscosity, at least intermittently, by correlating fluid pump discharge pressure at two or three pumping rates.

17. The method of claim 6 including measuring gel plug integrity, at least intermittently, by calculating plug length between transponders which locate the front and rear of the gel plug.

18. The method of claim 12, wherein the pigs are spheres of low-durometer hardness urethane rubber.

19. The method of claim 3 including inserting a dye into the fluid to assist in locating pipeline breaks.

20. The method of claim 1 including replenishing the gel plug by installing a tap in the pipeline and introducing replenishing material therethrough.

* * * * *